United States Patent
An

(10) Patent No.: US 8,301,174 B2
(45) Date of Patent: Oct. 30, 2012

(54) MOBILE TERMINAL AND METHOD FOR DISPLAYING LOCATION INFORMATION THEREIN

(75) Inventor: Hyo Jin An, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 712 days.

(21) Appl. No.: 12/172,732

(22) Filed: Jul. 14, 2008

(65) Prior Publication Data

US 2009/0017870 A1 Jan. 15, 2009

(30) Foreign Application Priority Data

Jul. 12, 2007 (KR) ........................ 10-2007-0070020

(51) Int. Cl.
*H04W 24/00* (2009.01)
(52) U.S. Cl. ....... 455/457; 455/566; 455/39; 455/456.3; 725/62
(58) Field of Classification Search .................. 455/566, 455/39, 456.3, 456.6, 457; 725/62
See application file for complete search history.

(56) References Cited

U.S. PATENT DOCUMENTS

| | | | | |
|---|---|---|---|---|
| 5,745,711 A * | 4/1998 | Kitahara et al. | ............... | 715/759 |
| 6,784,916 B2 * | 8/2004 | Smith | ......................... | 348/14.01 |
| 7,221,928 B2 * | 5/2007 | Laird et al. | .................. | 455/404.1 |
| 7,266,834 B1 * | 9/2007 | Lund et al. | ....................... | 725/47 |
| 7,528,879 B2 * | 5/2009 | Kuroki | ...................... | 348/333.03 |
| 7,630,724 B2 * | 12/2009 | Beyer et al. | .................... | 455/457 |
| 7,856,093 B2 * | 12/2010 | Fujimori et al. | ......... | 379/201.01 |
| 7,865,834 B1 * | 1/2011 | van Os et al. | ................. | 715/756 |
| 2002/0033879 A1 * | 3/2002 | Yoshimoto et al. | ........ | 348/14.08 |
| 2005/0099492 A1 * | 5/2005 | Orr | .......................... | 348/14.08 |
| 2005/0243810 A1 * | 11/2005 | Nose | ............................. | 370/356 |
| 2006/0034441 A1 * | 2/2006 | Kraft | ........................ | 379/142.01 |
| 2006/0170791 A1 * | 8/2006 | Porter et al. | ................ | 348/14.08 |
| 2006/0192848 A1 * | 8/2006 | Ni | ................................ | 348/14.08 |
| 2006/0199612 A1 * | 9/2006 | Beyer et al. | ................ | 455/556.2 |
| 2007/0039025 A1 * | 2/2007 | Kraft et al. | ...................... | 725/62 |
| 2007/0285501 A1 * | 12/2007 | Yim | .......................... | 348/14.08 |
| 2008/0076418 A1 * | 3/2008 | Beyer, Jr. | ..................... | 455/435.1 |
| 2008/0129816 A1 * | 6/2008 | Mattila et al. | ............... | 348/14.08 |
| 2008/0181132 A1 * | 7/2008 | Underhill et al. | ............. | 370/254 |
| 2008/0250459 A1 * | 10/2008 | Roman | ............................ | 725/62 |
| 2008/0307324 A1 * | 12/2008 | Westen et al. | .................. | 715/753 |

FOREIGN PATENT DOCUMENTS

| | | | |
|---|---|---|---|
| CN | 1571553 | | 1/2005 |
| JP | 2004085308 A | * | 3/2004 |
| JP | 2005-295329 | | 10/2005 |

* cited by examiner

*Primary Examiner* — Edward Urban
*Assistant Examiner* — Rui Hu
(74) *Attorney, Agent, or Firm* — Lee, Hong, Degerman, Kang & Waimey

(57) ABSTRACT

A mobile communication terminal is disclosed. The mobile communication terminal includes a wireless communication unit receiving another user's image for video communication and real-time location information of the other user; a display displaying the received other user's image and the real-time location information of the other user; and a controller controlling the wireless communication unit and display such that both the real-time location information and the other user's image are displayed together.

19 Claims, 11 Drawing Sheets

MOBILE TERMINAL AND METHOD FOR DISPLAYING LOCATION INFORMATION THEREIN

CROSS-REFERENCE TO RELATED APPLICATIONS

Pursuant to 35 U.S.C. §119(a), this application claims the benefit of earlier filing date and right of priority to Korean Application No. 10-2007-0070020, filed on Jul. 12, 2007, the contents of which are hereby incorporated by reference herein in their entirety

FIELD OF THE INVENTION

The present invention relates to a mobile terminal capable of displaying images for video communication and location information in the course of video communication.

DISCUSSION OF THE RELATED ART

A mobile terminal may be configured to perform various functions. Examples of such functions include data and voice communications, capturing images and video via a camera, recording audio, playing music files via a speaker system, and displaying images and video on a display. Some terminals also function as game players and multimedia players. More recently developed mobile terminals may receive broadcast and multicast signals which permit viewing of contents such as videos and television programs.

Efforts are ongoing to support and increase the functionality of mobile terminals. Such efforts include software and hardware improvements, as well as changes and improvements in the structural components which form the mobile terminal. The present invention is directed to confirming location information using the mobile terminal.

SUMMARY OF THE INVENTION

According to one embodiment of the present invention, a mobile terminal includes a user input unit for inputting a key signal, a wireless communication unit receiving another user's image for video communication and real-time location information of the other user, a display displaying the received other user's image and the real-time location information of the other user, and a controller controlling the wireless communication unit and display such that the real-time location information and the other user's image are displayed together. Preferably, the real-time location information is displayed over the other user's image.

In one aspect of the present invention, the real-time location information is displayed as an image including a map, text, or both the map and the text. The text may include at least one selected from the group consisting of a longitude, a latitude, a location name, a time, a mobile trace of the other user, a distance from the other user to the mobile terminal, and a time difference between a time at the other user's location and a time at a current location of the mobile terminal. Preferably, a mobile trace of the other user is indicated on the image including the map.

In another aspect of the present invention, the controller controls the display such that the real-time location information is displayed over the other user's image. The controller may control the display such that the real-time location information is displayed over the other user's image using image information received from the other user's mobile terminal and the image information includes the other user's image and the real-time location information of the other user. The map may be loaded in the mobile terminal or transmitted via the Internet. The mobile terminal may also include a memory storing at least one selected from the group consisting of the received other user's image and the received real-time location information of the other user.

In yet another aspect of the present invention, the controller generates a data file including the received other user's image and the real-time location information of the other user and then automatically stores the generated data file in the memory in response to a specific key signal input via the user input unit. Preferably, the controller sets an initial name for the generated data file. Preferably, the specific key signal is input by using a shortcut key provided to the user input unit. The controller may also transmit the real-time location information of the other user to a third party user if the key signal is input via a shortcut key provided by the user input unit. Preferably, the real-time location information transmitted to the third party user is included in a message.

According to another embodiment of the present invention, a mobile terminal includes a user input unit for inputting a key signal, a wireless communication unit transmitting a user image for video communication and real-time location information of the user, the wireless communication unit receiving an image of another user participating in the video communication, a display displaying the user image and the real-time location information of the user, a position-location module providing the real-time location information of the user, and a controller controlling the wireless communication unit, the display, and the position-location module such that the real-time location information of the user and the user image are displayed together, and the real-time location information of the user is transmitted via the position-location module.

According to yet another embodiment of the present invention, a method of displaying location information in a mobile terminal includes receiving another user's image for video communication and real-time location information of the other user and displaying both the received other user's image and the received real-time location information of the other user. Preferably, the real-time location information is displayed as an image including a map, text, or both the map and the text. Preferably, the real-time location information is displayed over the other user's image.

In one aspect of the present invention, the method of displaying the location information in the mobile terminal also includes storing at least one selected from the group consisting of the received other user's image and the received real-time location information of the other user. The method may also include transmitting the real-time location information of the other user to a third party user.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
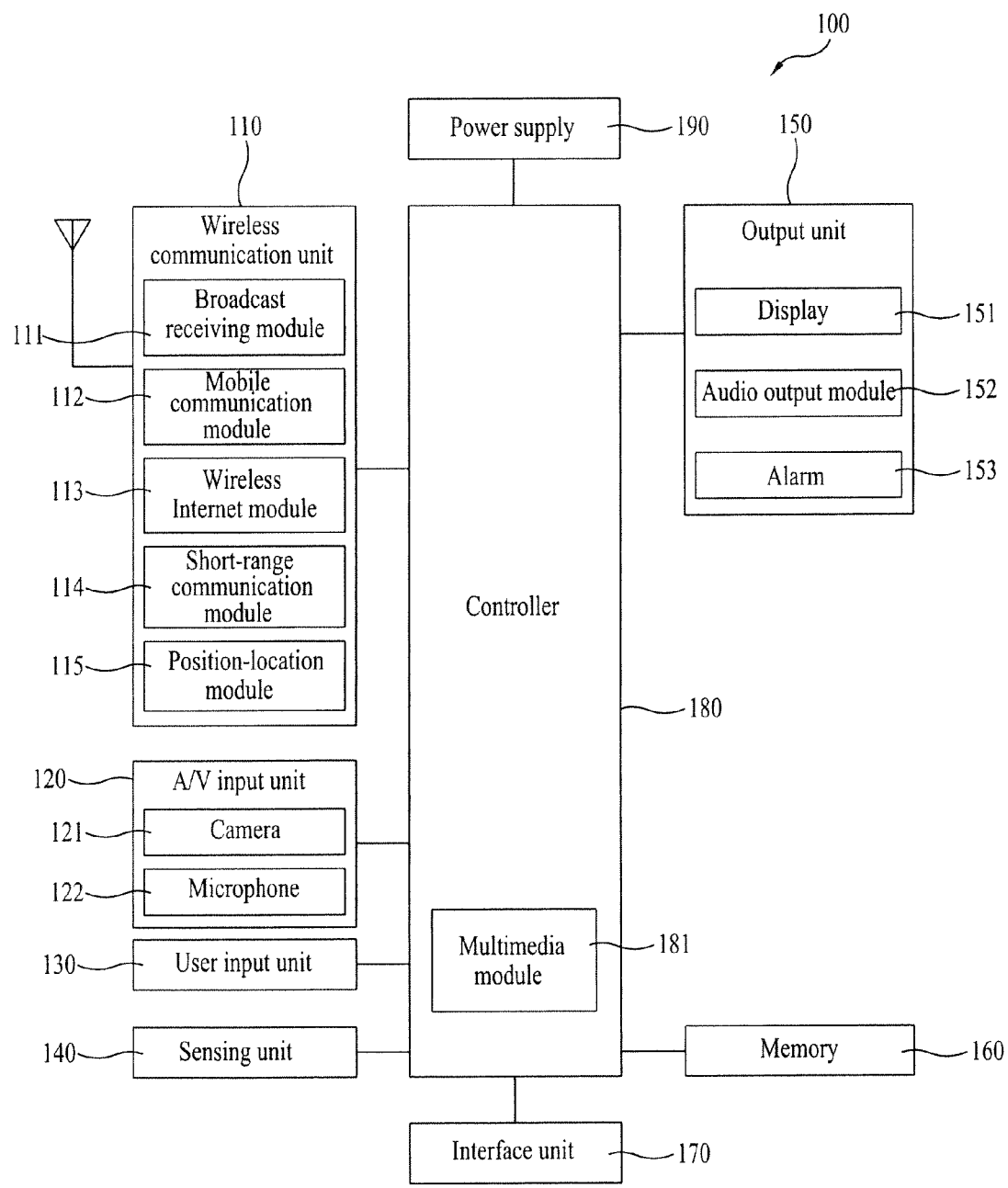
FIG. 1 is a block diagram of a mobile terminal in accordance with an embodiment of the present invention.

FIG. 1 is a block diagram of mobile terminal 100 in accordance with an embodiment of the present invention. The mobile terminal 100 may be implemented using a variety of different types of terminals. Examples of such terminals include mobile phones, user equipment, smart phones, computers, digital broadcast terminals, personal digital assistants, portable multimedia players (PMP) and navigators.

By way of non-limiting example only, further description will be with regard to a mobile terminal 100. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel or a terrestrial channel. The broadcast managing entity refers generally to a system which transmits a broadcast signal and/or broadcast associated information. Examples of broadcast associated information include information associated with a broadcast channel, a broadcast program, and a broadcast service provider. For example, the broadcast associated information may include an electronic program guide (EPG) of digital multimedia broadcasting (DMB) and electronic service guide (ESG) of digital video broadcast-handheld (DVB-H).

The broadcast signal may be implemented, for example, as a TV broadcast signal, a radio broadcast signal, or a data broadcast signal. The broadcast signal may further include a broadcast signal combined with a TV or radio broadcast signal.

The broadcast receiving module 111 may be configured to receive broadcast signals transmitted from various types of broadcast systems. By way of non-limiting examples, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. Data received by the broadcast receiving module 111 may be stored in a suitable device, such as the memory 160.

The mobile communication module 112 communicates wireless signals with one or more network entities, such as base station or Node-B. Such signals may represent, for example, audio, video, multimedia, control signaling, or data.

The wireless Internet module 113 supports Internet access for the mobile terminal 100. The wireless Internet module 113 may be internally or externally coupled to the mobile terminal 100.

The short-range communication module 114 facilitates relatively short-range communications. Suitable technologies for short-range communication may include, but are not limited to, radio frequency identification (RFID), infrared data association (IrDA), ultra-wideband (UWB), as well at the networking technologies commonly referred to as BLUETOOTH® and ZIGBEE®.

The position-location module 115 identifies or otherwise obtains the location of the mobile terminal 100. The position-location module 115 may be implemented using global positioning system (GPS) components which cooperate with associated satellites, network components, and combinations thereof.

The audio/video (A/V) input unit 120 is configured to provide audio or video signal input to the mobile terminal 100. As shown, the A/V input unit 120 includes a camera 121 and a microphone 122.

The camera 121 receives and processes image frames of still pictures or video.

The microphone 122 receives an external audio signal while the mobile terminal 100 is in a particular mode, such as phone call mode, recording mode and voice recognition. This audio signal is processed and converted into digital data. The mobile terminal 100, and specifically the A/V input unit 120, may include assorted noise removing algorithms to remove noise generated in the course of receiving the external audio signal. Data generated by the A/V input unit 120 may be stored in the memory 160, utilized by the output unit 150, or transmitted via one or more modules of the communication unit 110. If desired, two or more microphones and/or cameras may be used.

The user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a touchscreen display, which will be described in more detail later.

The sensing unit 140 provides status measurements of various aspects of the mobile terminal 100. For example, the sensing unit 140 may detect an open/close status of the mobile terminal 100, the relative positioning of components such as a display and keypad, a change of position of the mobile terminal or a component of the mobile terminal, a presence or absence of user contact with the mobile terminal, orientation or acceleration/deceleration of the mobile terminal.

The mobile terminal 100 may be configured as a slide-type mobile terminal and the sensing unit 140 may sense whether a sliding portion of the mobile terminal is open or closed. The sensing unit 140 may also sense the presence or absence of power provided by the power supply 190, the presence or absence of a coupling or other connection between the interface unit 170 and an external device.

The interface unit 170 may be implemented to couple the mobile terminal 100 with external devices. Typical external devices include wired/wireless headphones, external chargers, power supplies, storage devices configured to store data such as audio, video, and pictures, earphones, and microphones. The interface unit 170 may be configured using a wired/wireless data port, audio input/output ports, video input/output ports, or a card socket for coupling to a memory card, subscriber identity module (SIM) card, user identity module (UIM) card, or a removable user identity module (RUIM) card.

The output unit 150 may include various components that support the output requirements of the mobile terminal 100. The display 151 may be implemented to visually display information associated with the mobile terminal 100. The display 151 may provide a user interface or graphical user interface that includes information associated with placing, conducting, and terminating a phone call if the mobile terminal 100 is operating in a phone call mode. As another example, the display 151 may additionally or alternatively display images which are associated with a video call mode or a photographing mode.

One particular implementation of the present invention includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more displays 151. An example of a two-display embodiment is one in which one display 151 is configured as an internal display viewable when the terminal is in an opened position and a second display 151 configured as an external display viewable in both the open and closed positions.

FIG. 1 further shows the output unit 150 having an audio output module 152, which supports the audio output requirements of the mobile terminal 100. The audio output module 152 may be implemented using one or more speakers, buzzers, other audio producing devices, or combinations thereof.

The audio output module 152 functions in various modes such as call-receiving mode, call-placing mode, recording mode, voice recognition mode and broadcast reception mode.

The audio output module 152 outputs audio relating to a particular function or status, such as call received, message received, or errors.

The output unit 150 is further shown having an alarm 153, which may signal or otherwise identify the occurrence of a particular event associated with the mobile terminal 100. Typical events include call received, message received and user input received.

An example of a signal provided by the output unit 150 is a tactile sensation. For example, the alarm 153 may be configured to vibrate responsive to the mobile terminal 100 receiving a call or message. As another example, vibration may be provided by the alarm 153 responsive to receiving user input at the mobile terminal 100 in order to provide a tactile feedback mechanism. It is understood that the various signals provided by the components of output unit 150 may be separately performed, or performed using any combination of such components.

The memory 160 is generally used to store various types of data to support the processing, control, and storage requirements of the mobile terminal 100. Examples of such data include program instructions for applications operating in the mobile terminal 100, contact data, phonebook data, messages, pictures, and video.

The memory 160 shown in FIG. 1 may be implemented using any type or combination of suitable volatile and non-volatile memory or storage devices. Examples of memory types are random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk memory, card-type memory, and other similar memory or data storage devices.

The controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

The power supply 190 provides power required by the various components for the mobile terminal 100. The power may be internal power, external power, or combinations thereof.

Various embodiments described herein may be implemented in various ways. For example, the embodiments may be implemented in a computer-readable medium using computer software, hardware, or some combination thereof.

For a hardware implementation, the embodiments described may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory, such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However, such teachings apply equally to other types of mobile terminals 100.

Figure 2:
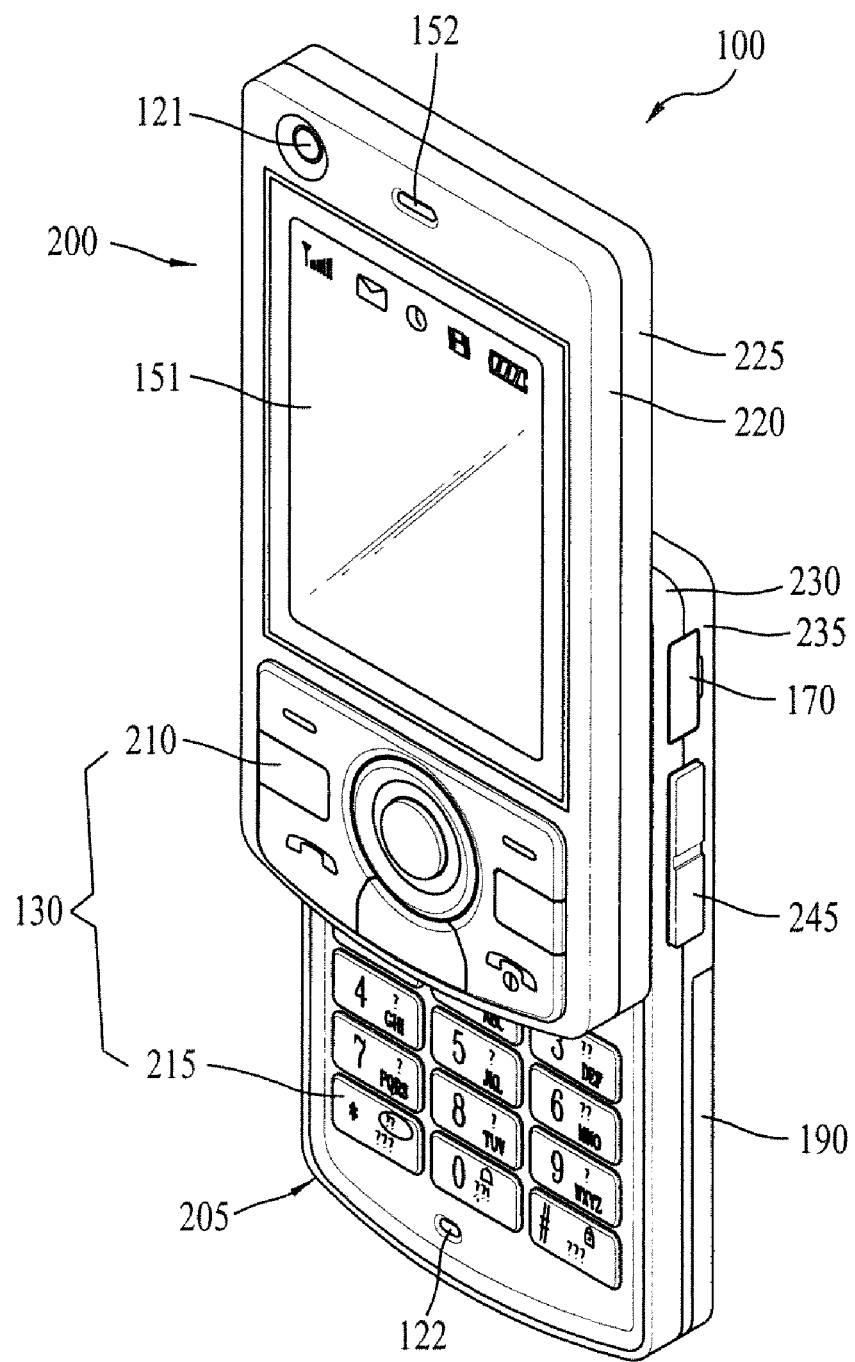
FIG. 2 is a perspective view of a front side of a mobile terminal according to an embodiment of the present invention.

FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 (described in FIG. 1) is implemented using function keys 210 and a keypad 215. The function keys 210 are located on the first body 200 and the keypad 215 is located on the second body 205. The keypad 215 includes various keys, such as numbers, characters, and symbols to enable a user to place a call, prepare a text or multimedia message, and otherwise operate the mobile terminal 100.

The first body 200 slides relative to the second body 205 between open and closed positions. The first body 200 is positioned over the second body 205 in the closed position such that the keypad 215 is substantially or completely obscured by the first body. User access to the keypad 215, the display 151 and the function keys 210 is facilitated in the open position. The function keys 210 are conveniently configured for a user to enter commands, such as start, stop and scroll.

The mobile terminal 100 is operable in either a standby mode or an active call mode. The mobile terminal 100 is able to receive a call or message and to receive and respond to network control signaling in the standby mode.

The mobile terminal 100 typically operates in the standby mode in the closed position and in the active mode in the open position. This mode configuration may be changed as required or desired.

The first body 200 is shown formed of a first case 220 and a second case 225. The second body 205 is shown formed of a first case 230 and a second case 235. The front case 220 and second case 225 of the first body 200 and the first case 230 and second case 235 or the second body 205 are usually formed of a suitably rigid material, such as injection molded plastic, or formed using metallic material, such as stainless steel (STS) and titanium (Ti).

One or more intermediate cases may be provided between the first case 220 and second case 225 of the first body 200 or between the first case 230 and second case 235 of the second body 205. The first body 200 and second body 205 are typically sized to receive electronic components necessary to support operation of the mobile terminal 100.

The first body 200 is shown having a camera 121 and audio output module 152, which is configured as a speaker, positioned relative to the display 151. The camera 121 may be constructed such that it can be selectively positioned relative to first body 200, such as by rotation or swiveling.

The function keys 210 are positioned adjacent to a lower side of the display 151, which is shown implemented as an LCD or OLED. The display 151 may also be configured as a touch screen having an underlying touchpad which generates signals responsive to user contact with the touch screen, such as with a finger or stylus.

The second body 205 is shown having a microphone 122 positioned adjacent to the keypad 215 and having side keys 245, which are one type of user input unit, positioned along the side of second body. Preferably, the side keys 245 are configured as hot keys, such that the side keys are associated with a particular function of the mobile terminal 100.

An interface unit 170 is shown positioned adjacent to the side keys 245. A power supply 190 in a form of a battery is shown located on a lower portion of the second body 205.

Figure 3:
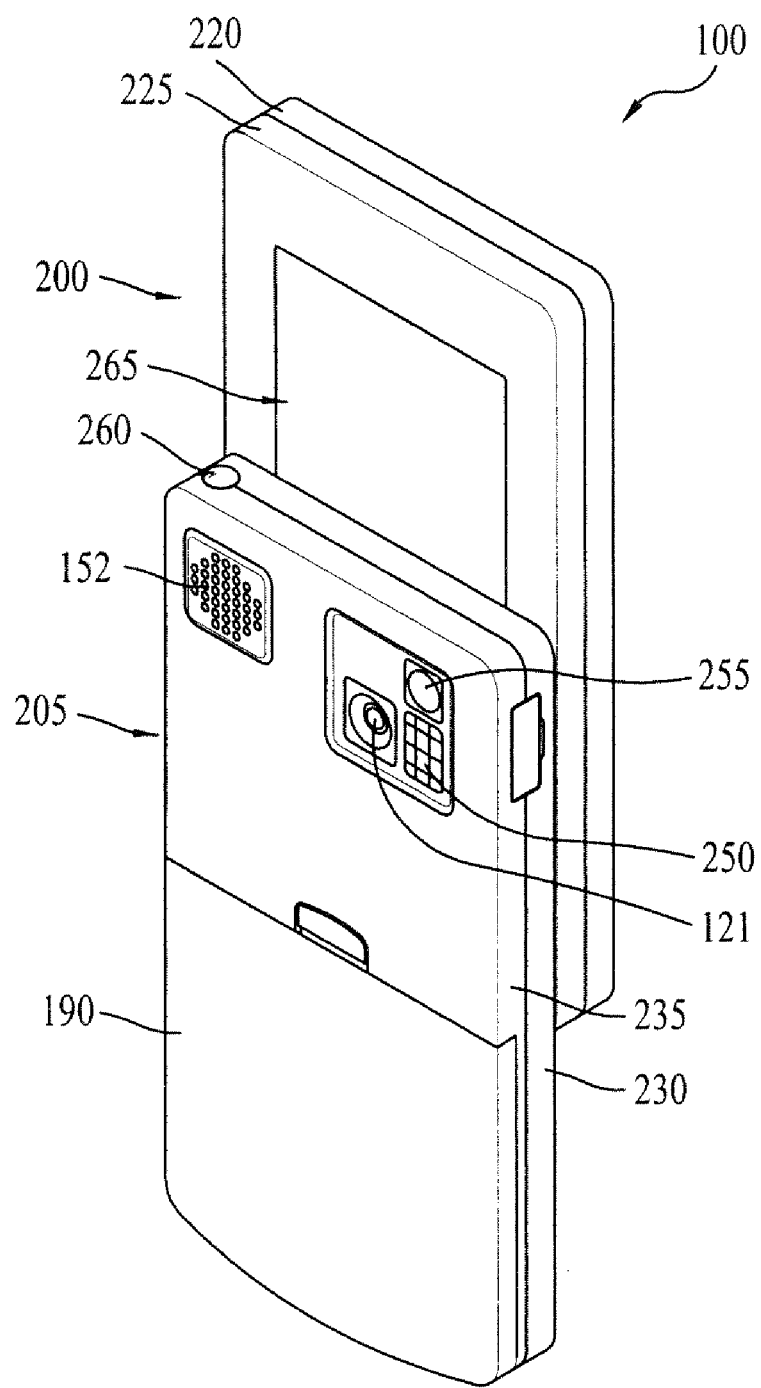
FIG. 3 is a rear view of the mobile terminal shown in FIG. 2.

FIG. 3 is a rear view of the mobile terminal shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 illustrated in FIG. 3 faces a direction opposite to a direction faced by the camera 121 of the first body 200 illustrated in FIG. 2. Each of the cameras 121 of the first body 200 and second body 205 may have the same or different capabilities.

The camera 121 of the first body 200 in one embodiment operates with a relatively lower resolution than the camera 121 of the second body 205. Such an arrangement works well during a video conference, for example, in which reverse link bandwidth capabilities may be limited. The relatively higher resolution of the camera 121 of the second body 205 is useful for obtaining higher quality pictures for later use or for communicating with other parties.

The second body 205 illustrated in FIG. 3 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205 in FIG. 3. The antenna 260 functions in cooperation with the broadcast receiving module 111 illustrated in FIG. 1. The antenna 260 may be fixed or retractable into the second body 205.

The rear side of the first body 200 includes a slide module 265. The slide module 265 slidably couples with a corresponding slide module located on the front side of the second body 205.

It is understood that the arrangement of the various components of the first body 200 and second body 205 illustrated in FIGS. 2 and 3 may be modified as required or desired. For example, some or all of the components of one body may alternatively be implemented on the other body. Further, the location and relative positioning of the components are not critical and, therefore, the components may be positioned at locations which differ from those shown in FIGS. 2 and 3.

The mobile terminal 100 of FIGS. 1-3 may be configured to operate within a communication system which transmits data via frames or packets, including both wireless and wired communication systems and satellite-based communication systems. Such communication systems utilize different air interfaces and/or physical layers.

Examples of air interfaces utilized by the communication systems include frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
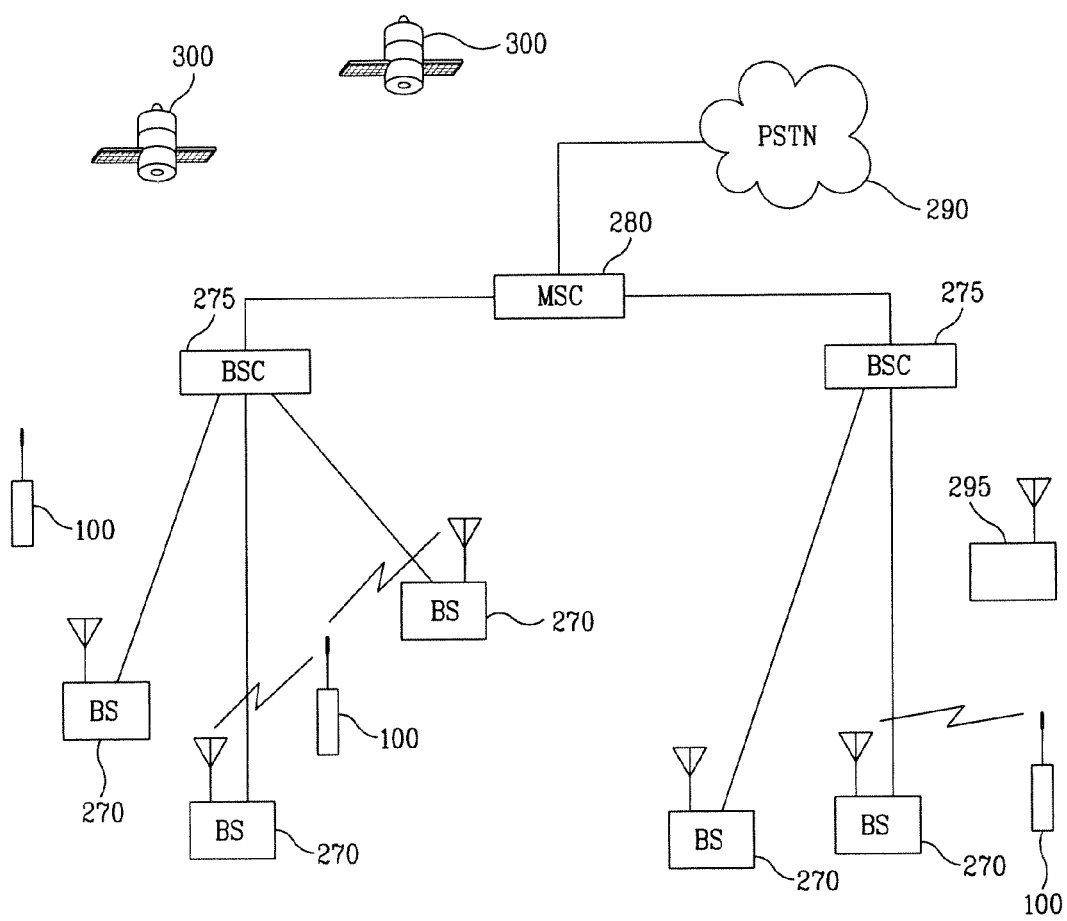
FIG. 4 is a block diagram of a CDMA wireless communication system operable with the mobile terminal of FIGS. 1-3.

Referring to FIG. 4, a CDMA wireless communication system is shown having a plurality of mobile terminals 100, a plurality of base stations (BS) 270, a plurality of base station controllers (BSC) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including E1/T1, ATM, IP, PPP, Frame Relay, HDSL, ADSL, or xDSL. It is to be understood that the system may include more than two BSCs 275.

Each BS 270 may include one or more sectors, each sector having an omni-directional antenna or an antenna pointed in a particular direction radially away from the base station. Alternatively, each sector may include two antennas for diversity reception. Each BS 270 may be configured to support a plurality of frequency assignments each having a particular spectrum, such as 1.25 MHz or 5 MHz.

The intersection of a sector and frequency assignment may be referred to as a CDMA channel. The BSs 270 may also be referred to as base station transceiver subsystems (BTSs).

The term "base station" may be used to refer collectively to a BSC 275 and one or more BSs 270. The BSs 270 may also be denoted as "cell sites." Alternatively, individual sectors of a given BS 270 may be referred to as "cell sites."

A terrestrial digital multimedia broadcasting (DMB) transmitter (BT) 295 is shown broadcasting to the mobile terminals 100 operating within the system. The broadcast receiving module 111 illustrated in FIG. 1 may be configured to receive broadcast signals transmitted by the BT 295. Similar arrangements may be implemented for other types of broadcast and multicast signaling as discussed above.

FIG. 4 further depicts several global positioning system (GPS) satellites 300 that facilitate locating the position of some or all of the mobile terminals 100. Two satellites 300 are depicted, but it is understood that useful positioning information may be obtained with greater or fewer satellites.

The position-location module 115 illustrated in FIG. 1 may be configured to cooperate with the satellites 300 to obtain desired position information. It is to be appreciated that other types of position detection technology may alternatively be implemented, such as location technology that may be used in addition to or instead of GPS location technology. If desired, some or all of the GPS satellites 300 may alternatively or additionally be configured to provide satellite DMB transmissions.

During typical operation of the wireless communication system, the BSs 270 receive sets of reverse-link signals from various mobile terminals 100. The mobile terminals 100 perform calls, messaging, and other communications.

Each reverse-link signal received by a given BS 270 is processed within that BS. The resulting data is forwarded to an associated BSC 275.

The BSC 275 provides call resource allocation and mobility management functionality including soft handoffs between the BSs 270. The BSCs 275 also route the received data to the MSC 280, which provides additional routing services for interfacing with the PSTN 290.

Similarly, the PSTN 290 interfaces with the MSC 280, which interfaces with the BSCs 275. The BSCs 275 control the BSs 270 to transmit sets of forward-link signals to the mobile terminals 100.

Figure 5:
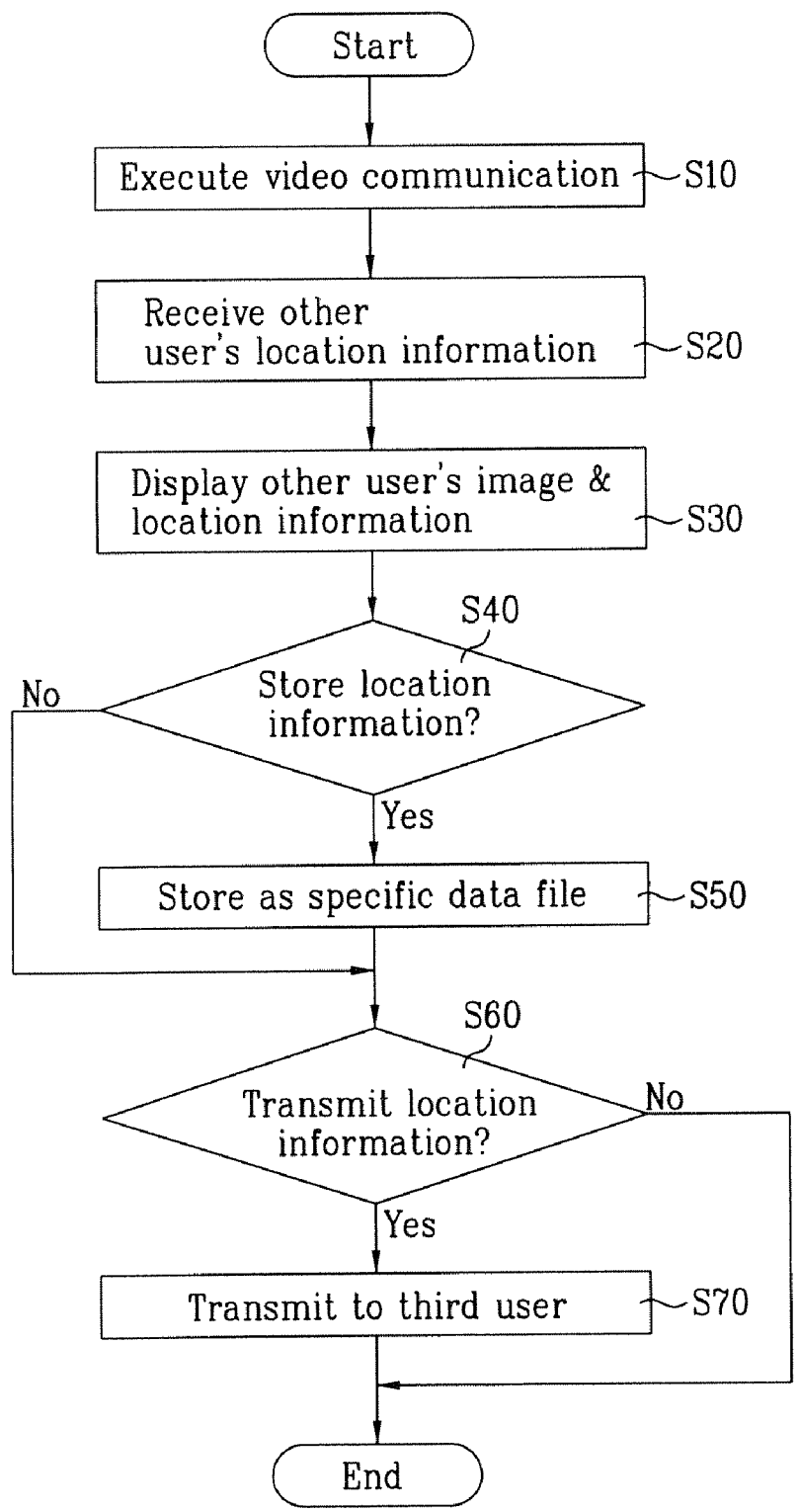
FIG. 5 is a flowchart illustrating a method of displaying location information in a mobile terminal according to one embodiment of the present invention.

A method of displaying location information in a mobile terminal 100 according to one embodiment of the present invention is described as follows. Referring to FIG. 5, a first user of the mobile terminal 100 performs video communication by exchanging images with another user or second user by transmitting and receiving video calls (S10). The second user may transmit real-time location information during the video call.

The location information transmitted from the second user is received via a wireless communication unit 110 along with an image of the second user (S20). The first user then decides whether to receive the location information from the second user. For example, a message for querying 'Will you receive the location information from the other user?' is displayed as a pop-up message on a mobile terminal 100 of the first user when the second user transmits location information. In response to the querying message, the first user selects either 'OK' or 'No' to accept or reject receiving the location information from the other user.

If the first user selects 'OK' and receives the location information from the second user, a controller 180 displays both the image and location information received from the second user on a display 151 (S30). The location information received from the second user may be displayed as an image including a map, text, or both the map and the text.

Figure 6:
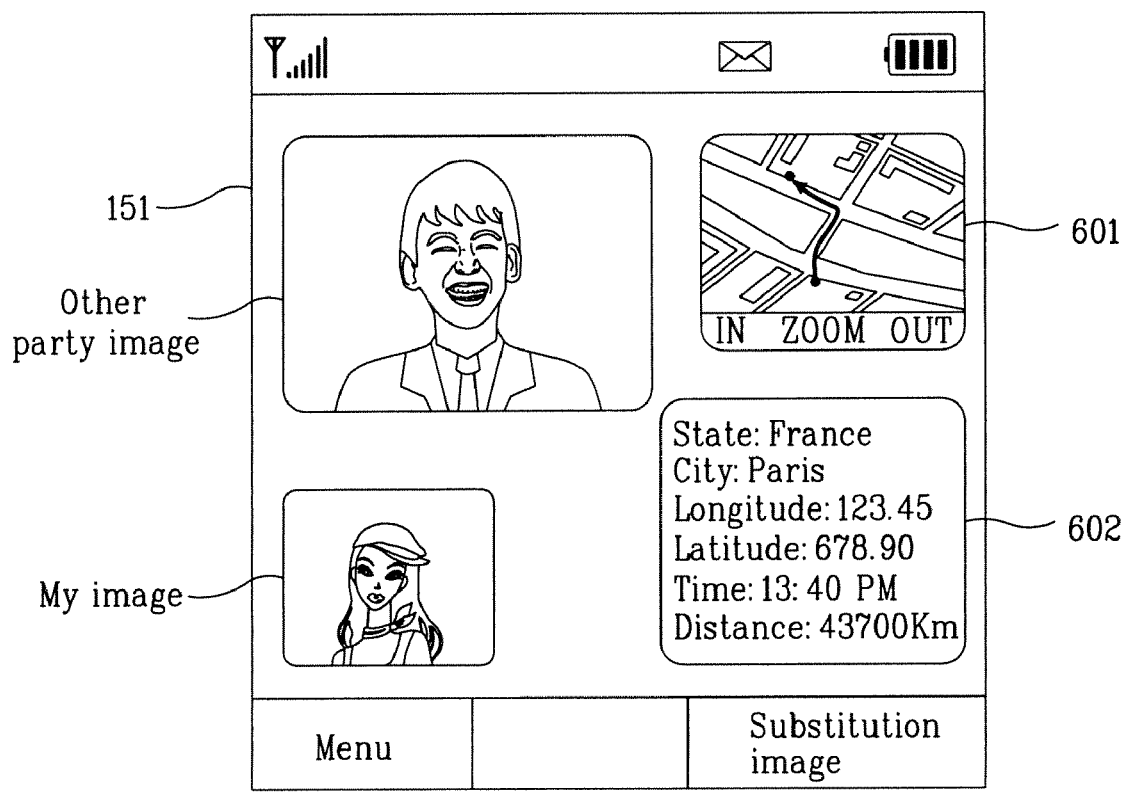
FIG. 6 is a screen view of a display on a mobile terminal according to one embodiment of the present invention in which location information is displayed.

Referring to FIG. 6, a second user image 'Other party image' is displayed on a left upper portion of a display screen 151 and a first user image 'My image' is displayed below the second user image, the second user image being larger than the first user image. In addition, the location information of the second user is displayed as a map image 601 on a right side of the second user image and as text 602 below the map image.

Figure 7A:
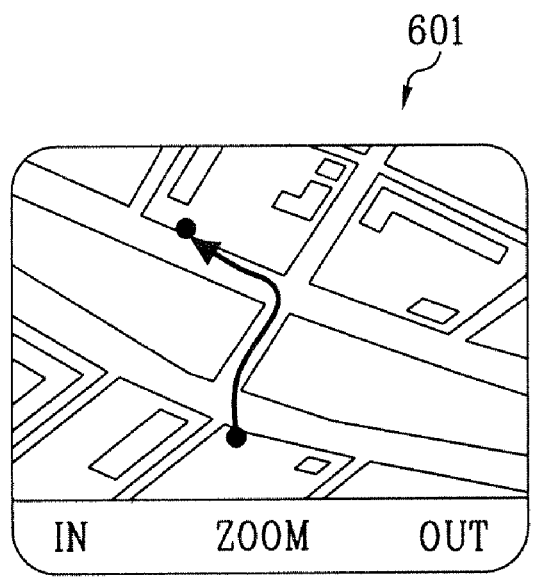
FIG. 7A and FIG. 7B are enlarged views of the images shown in FIG. 6 which include a map and text.

Referring to FIG. 7A, a trace of the second user's mobile terminal 100 is represented as an arrow connecting two dots in the map image 601. The first user may track a mobile path of the second user based on the trace. The displayed map can be sent by the second user. Alternatively, a map loaded in the mobile terminal 100 may be used. Alternatively, a map transferred via Internet may be used. For example, a map may be transferred via a WAP (wireless application protocol) network.

Figure 7B:
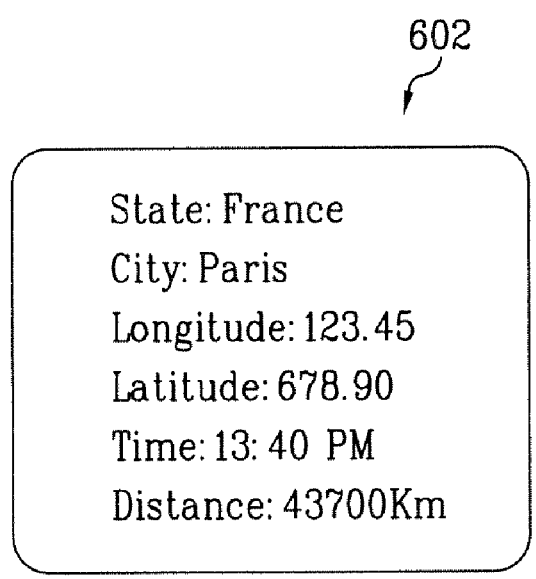

In the displayed text 602, a state, a city, a longitude, a latitude, a time and a distance may be indicated, as shown in FIG. 7B. Additional information may be included in the text 602. For example, a time difference between a location of the first user and the location of the second user may be included in the text 602.

According to one embodiment of the present invention, the location information of the second user may be displayed on the second user image. For example, both the second user image and the location information of the second user may be included in image data received from the second user. Alternatively, the image data containing both the second user image and the location information of the second user may be generated from a mobile terminal 100 of the second user.

Figure 8:
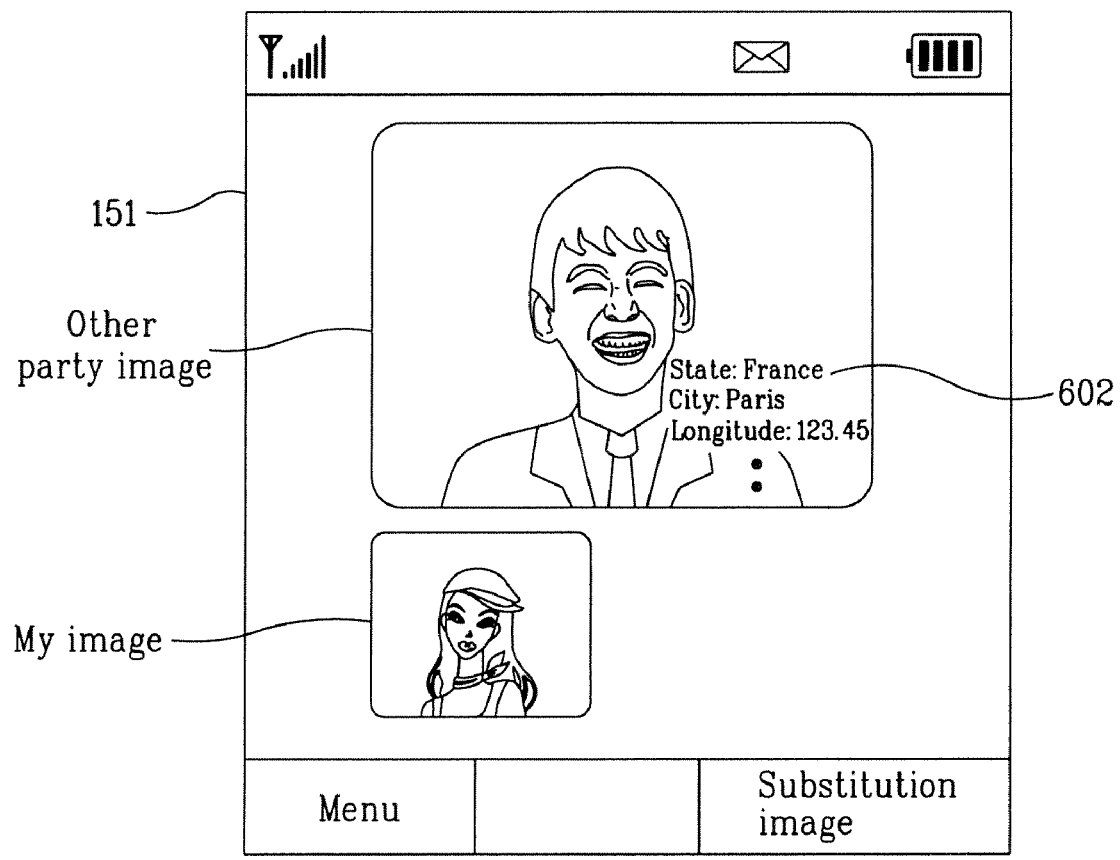
FIG. 8 is a screen view of a display of a mobile terminal according to one embodiment of the present invention in which location information is displayed.

Various methods can be implemented for displaying the location information of the second user over the second user image. For example, the location information of the second user may be displayed overlapping the second user image, as shown in FIG. 8. Referring to FIG. 8, the location information text 600 of the second user is displayed overlapping the second user image. The location information may also be displayed as an image including a map as well as the text 602.

The location information of the second user displayed by the method may be stored in a memory 160. Both the second user image and the location information of the second user may be stored together. The controller 180 generates a specific data file including both the second user image and the location information of the second user and then automatically stores the specific data file in the memory 160 (S40, S50 in FIG. 5). Generation and automatic storage of the specific data file may be executed in response to the first user's input via input unit 130 such as specific keys. A signal input via the specific key may be carried out using a shortcut key or a hot key for convenient manipulation of the terminal 100.

The controller 180 may set the location information to an initial name of the specific data file. Various initial names may be available for the specific data file. For example, the initial name of the stored specific data file may be set to include 'name or phone number+location+date+time'. Specifically, if the video communication is performed with a second user in Paris, France on Jan. 1, 2007, an initial file name of specific data may be set to 'Hong Gil-dong Paris 200701011530'. Therefore, the first user may recognize contents of the video communication by viewing the initial file name.

The location information of the second user, which is displayed by the method, may be sent to a third user (S60, S70 in FIG. 5). For example, if the second user is in an emergency situation, the third user may be informed of the emergency situation. The third user may be an emergency agency having a help line, such as '119' or '911', who can take care of the emergency situation.

If a key signal is input via a shortcut key for transmission of the information, the controller 180 transmits the location information of the second user to the third user. In particular, the location information of the second user may be transmitted using a phone number of the third user. Alternatively, the location information of the second user may be transmitted such that the second user directly inputs the phone number of the third user to transmit the location information.

The controller 180 may transmit the location information as a message. For example, the controller 180 inserts the location information in a SMS message or MMS message and then transmits a corresponding message. If a key signal is input via a specific shortcut key, the controller 180 automatically generates a message containing the location information and then transmits the generated message to the third user.

Figure 9:
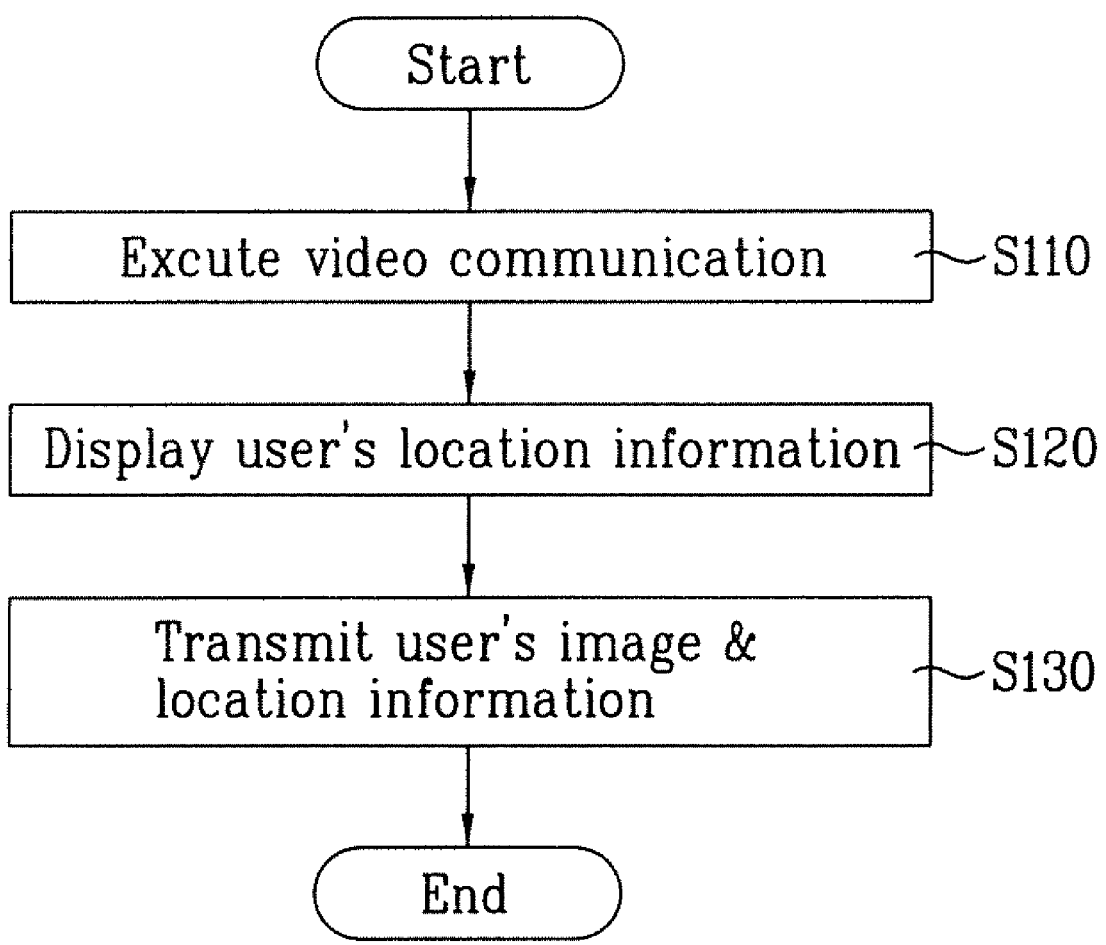
FIG. 9 is a flowchart illustrating a method of transmitting location information in a mobile terminal according to one embodiment of the present invention.

The present invention may include a mobile terminal 100 capable of transmitting location information and a user image to another user when performing video communication. Referring to FIG. 9, a first user may perform video communication by exchanging images with another user or second user through transmission and reception of video calls (S110). The first user's real-time location information is displayed on a mobile terminal 100 of the first user (S120). The first user may transmit the real-time location information along with a first user image to the second user (S130). The controller 180 may display the location information of the first user and the first user image together.

Figure 10:
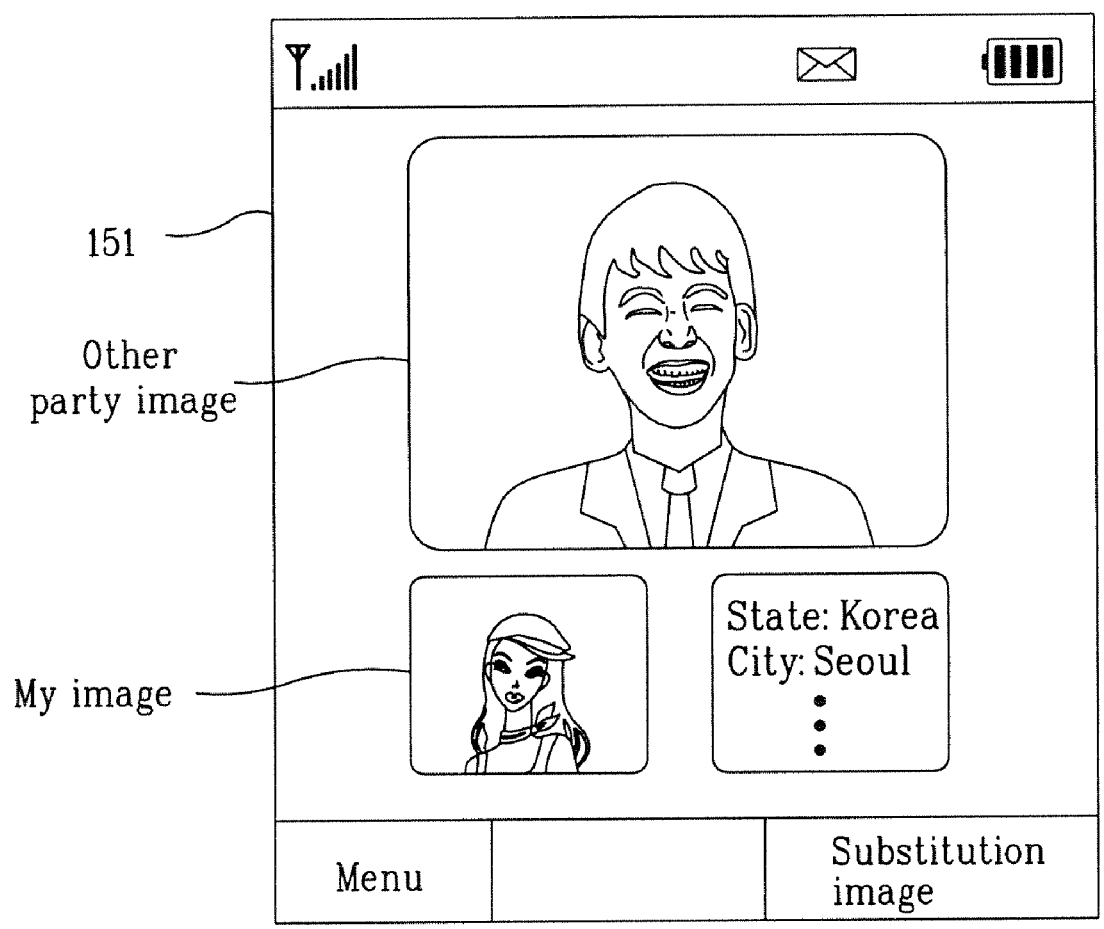
FIGS. 10 and 11 are screen views of a display of a mobile terminal according to one embodiment of the present invention in which location information is displayed.

Referring to FIG. 10, the location information is displayed as text on the right side of the display 151 next to the first user image 'My image'. Alternatively, the location information may be displayed as an image including a map. Alternatively, both the map and the text may be displayed together.

If a specific key signal is input, the controller 180 generates image information including the user image and user location information and then transmits the generated image information to another user. The specific key signal may be generated by shortcut key manipulation.

According to one embodiment of the present invention, a mobile terminal 100 includes a position location module 115 and the controller 180 displays its location information via the position location module.

Figure 11:
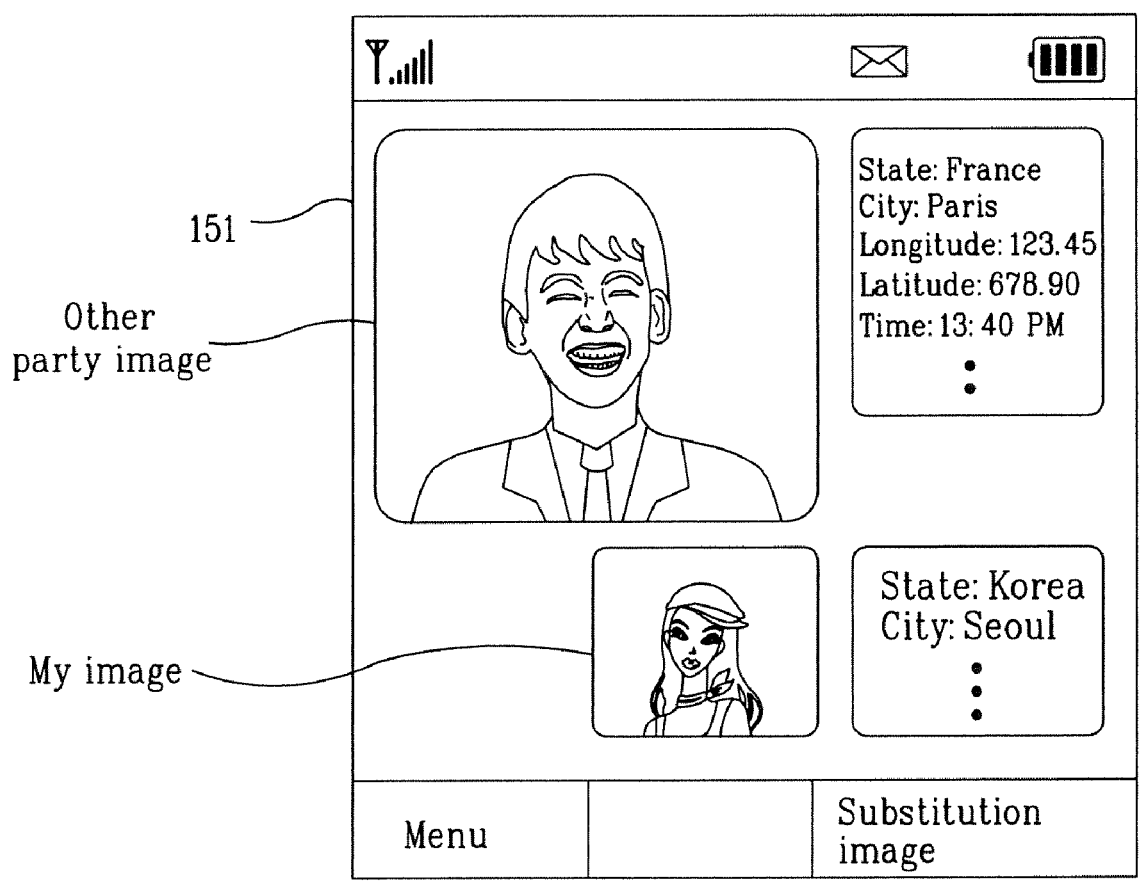

According to one embodiment of the present invention, a mobile terminal 100 may display both location information of the first user and location information of the second user. The mobile terminal 100 may display the location information of the second user to confirm the received location information of the second user while displaying the first user's location information to be transmitted, as shown in FIG. 11. Referring to FIG. 11, the location information of the second user is displayed as text on the right side of the second user image 'Other party image' and the location information of the first user is displayed as text on the right side of the first user image 'My image'. Alternatively, the second user location information and the first user location information may be displayed as images.

The present invention provides several effects and advantages. First, location information of another user can be confirmed in the course of video communication. Second, an image and location information of another user can be stored together in the course of video communication. Third, location information of another user can be transmitted to a third user in the course of video communication. Fourth, location information of a user can be transmitted to another user in the course of video communication.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A mobile terminal comprising: a user input unit configured to generate a signal in response to an input; a camera configured to receive a first image; a wireless communication unit configured to: transmit the first image to another terminal for video communication; receive a second image from the other terminal for the video communication; and receive real-time location information of the other terminal from the other terminal; a display configured to display both the first image and the second image for the video communication; a memory configured to store a data file including the received second image and the received real-time location information; and a controller configured to: control the wireless communication unit and the display to cause the real-time location information to be displayed on the display such that the displayed real-time location information overlaps the displayed second image on a display screen of the display; and control the memory to store the data file, wherein a name of the stored data file includes at least a portion of the received real-time location information.

2. The mobile terminal of claim 1, wherein the real-time location information is displayed as an image including a map, text, or both the map and the text.

3. The mobile terminal of claim 2, wherein the text comprises at least one selected from the group consisting of a longitude, a latitude, a location name, a time, a mobile trace of the other terminal, a distance from the other terminal to the mobile terminal, and a time difference between a time at the other terminal's location and a time at a current location of the mobile terminal.

4. The mobile terminal of claim 2, wherein a mobile trace of the other terminal is indicated on the image including the map.

5. The mobile terminal of claim 1, wherein the controller is further configured to control the display to cause the real-time location information to be displayed over the second image using image information received from the other terminal and the image information comprises the second image and the real-time location information of the other terminal.

6. The mobile terminal of claim 2, wherein the map is loaded in the mobile terminal or transmitted via the Internet.

7. The mobile terminal of claim 1, wherein the controller is further configured to control the memory to store the data file automatically when the data file is generated.

8. The mobile terminal of claim 1, wherein the controller is further configured to control the memory to store the data file in response to a user input received via the user input unit.

9. The mobile terminal of claim 1, wherein the controller is further configured to transmit the real-time location information of the other terminal to a third party terminal in response to the signal generated by the user input unit.

10. The mobile terminal of claim 9, wherein the controller is further configured to control the wireless communication unit to transmit a message including the real-time location information to the third party terminal.

11. The mobile terminal of claim 1, wherein the first image comprises a user of the mobile terminal and the second image comprises a user of the other mobile terminal.

12. A mobile terminal comprising: a user input unit configured to generate a key signal in response to an input; a camera configured to receive a first image; a wireless communication unit configured to: transmit the first image and real-time location information of the terminal to another terminal for video communication; receive a second image from the other terminal for the video communication; and receive real-time location information of the other terminal from the other terminal; a display configured to display the first image and the real-time location information of the terminal, and the second image and the real-time location information of the other terminal; a position-location module configured to provide the real-time location information of the terminal; a memory configured to store a data file including the received second image and the received real-time location information; and a controller configured to: control the wireless communication unit, the display, the position-location module, and the memory to cause the real-time location information of the terminal, the first image, the second image, and the real-time location information of the other terminal to be displayed together on the display; cause the real-time location information of the terminal to be transmitted via the position-location module; and control the memory to store the data file, wherein the displayed real-time location information of the other terminal overlaps the displayed second image on a display screen of the display, and wherein a name of the stored data file includes at least a portion of the received real-time location information.

13. A method of displaying location information in a mobile terminal, the method comprising: receiving, via a camera of the mobile terminal, a first image; transmitting the first image to another terminal for video communication; receiving a second image and real-time location information of the other terminal from the other terminal; displaying the first image and the received second image and the received real-time location information on a display of the mobile terminal; and storing, in a memory of the mobile terminal, a data file including the received second image and the received real-time location information, wherein the displayed real-time location information overlaps the displayed second image on a display screen of the display, and wherein a name of the stored data file includes at least a portion of the received real-time location information.

14. The method of claim 13, wherein the real-time location information is displayed as an image including a map, text, or both the map and the text.

15. The method of claim 13, wherein the data file is stored in the memory automatically.

16. The method of claim 13, further comprising:
    transmitting the real-time location information of the other terminal to a third party user.

17. A mobile terminal, comprising: a user input unit configured to receive an input; a camera configured to receive a first image; a wireless communication unit configured to: transmit the first image to another terminal for video communication with the other terminal; receive a second image from the other terminal for the video communication; and receive real-time location information of the other terminal from the other terminal; a display configured to display both the first image and the second image for the video communication; and a controller configured to: control the wireless communication unit and the display to cause the received real-time location information to be displayed on the display such that the displayed real-time location information overlaps the displayed second image on a display screen of the display; store the received second image and the received real-time location information in the mobile terminal; and control the wireless communication unit to transmit the received real-time location information to a third party terminal.

18. The mobile terminal of claim 17, wherein the controller is further configured to:
    generate a message including the real-time location information; and
    control the wireless communication unit to transmit the generated message to the third party terminal.

19. The mobile terminal of claim 18, wherein the message comprises a short message service (SMS) message or a multimedia message service (MMS) message.

* * * * *